United States Patent

Sigler 4,043,643

Aug. 23, 1977

[54] CATADIOPTIC TELESCOPE

[75] Inventor: Robert D. Sigler, Ann Arbor, Mich.

[73] Assignee: KMS Fusion, Inc., Ann Arbor, Mich.

[21] Appl. No.: 686,363

[22] Filed: May 14, 1976

[51] Int. Cl.² .............................................. G02B 17/08
[52] U.S. Cl. .................................................... 350/200
[58] Field of Search ................................... 350/199, 200

[56] References Cited

U.S. PATENT DOCUMENTS 3,049,054  8/1962  Waland ................................. 350/199

OTHER PUBLICATIONS

Sigler; "A Family of Compact Schmidt-Cassegrain Telescope Designs," Applied Optics, vol. 13, No. 8.

Primary Examiner—John K. Corbin
Assistant Examiner—Conrad Clark
Attorney, Agent, or Firm—Barnes, Kisselle, Raisch & Choate

[57] ABSTRACT

A Cassegrain telescope with spherical primary and secondary mirrors and a corrector plate located between the focal point and the center of the radius of curvature of the primary mirror. The secondary mirror is located between the focal point and the vertex of the primary mirror and the image surface is beyond or behind the vertex of the primary mirror.

16 Claims, 6 Drawing Figures

FIG. 6
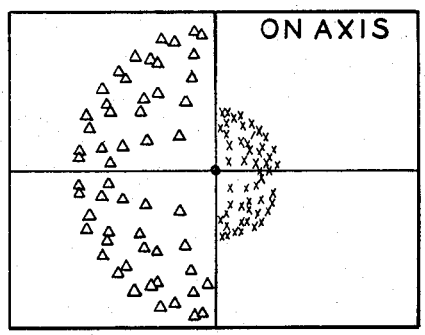
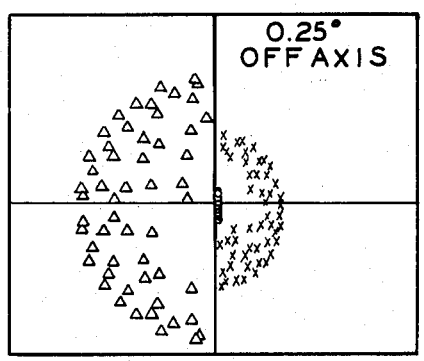
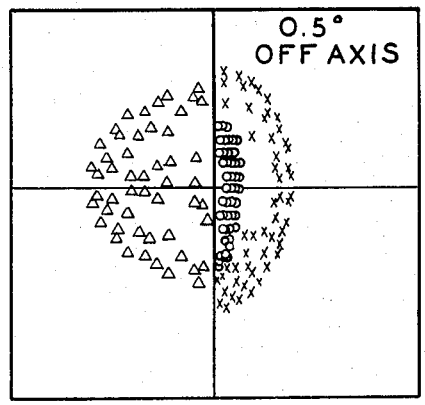
O = 5893 Å
X = 6563 Å
△ = 4861 Å
DIFFRACTION LIMITED SPOT SIZE

CATADIOPTIC TELESCOPE

This invention relates to telescopes for visual observation and photographing of celestial bodies and more particularly to a Cassegrain telescope with a Schmidt corrector plate.

In general, the images actually formed by all lens and mirror systems contain slight deviations or departures from the image predicted by geometric optical theory which are called aberrations. In the monochromatic third order theory of geometric optics there are considered to be five specific types of deviations or aberrations of an actual ray of light from the path prescribed by the classical ray tracing formulas. These five aberrations are known as spherical aberration, coma, astigmatism, field curvature, and distortion. The performance of astronomical telescopes used for visual observation of celestial bodies is primarily affected by any chromatic aberrations and the monochromatic aberrations of coma, astigmatism, and spherical aberration.

A Cassegrain telescope with primary and secondary mirrors and a corrector plate all located on a common geometric axis is described in an article by E. H. Linfoot published in Mon. Not. R. Astron. Soc. 104, 54 (1944). The primary and secondary mirrors of this telescope have a common center of curvature, the corrector plate is positioned at the common center of curvature, and the secondary mirror is positioned between the vertex of the primary mirror and the focal point of the primary mirror. This type of Cassegrain telescope has a relatively large secondary obstruction ratio, small secondary magnification, and frequently an image surface positioned in front of or immediately adjacent the primary mirror, all of which impair the performance of such telescopes for visual observation of celestial bodies.

A Cassegrain telescope with spherical primary and secondary mirrors in which both the corrector plate and the secondary mirror are located between the vertex of the primary mirror and the focus of the primary mirror is disclosed in an article by A. S. Devany published in Sky and Telescope, Vol. 29, No. 5 (1965). The telescope disclosed by Devany has both coma and astigmatism, and its performance is not much better than the classical two-mirror Cassegrain telescope without any corrector plate. Compact Cassegrain telescopes with a spherical primary mirror, an aspherical secondary mirror, and a corrector plate with both the corrector plate and the secondary mirror located between the vertex of the primary mirror and the focal point of the primary mirror are also disclosed in an article by the inventor, R. D. Sigler published in Applied Optics, Vol. 13, No. 8 (1974).

Objects of this invention are to provide an astronomical telescope for visual observation and photographing of celestial bodies which has the image plane in a readily accessible location beyond the primary mirror, a greater range of and a larger maximum useful secondary magnification ratio, a smaller ratio of obstruction of light by the secondary mirror, a relatively compact configuration, no coma, no spherical aberration, little astigmatism, little distortion, little chromatic aberration, modest field curvature, diffraction limited images over a field of view of at least one degree, and optical elements that can be easily and economically produced with a high degree of accuracy, and which is of economical manufacture and assembly.

These and other objects, features and advantages of this invention will be apparent from the following disclosure, appended claims, and accompanying drawings in which:

FIG. 6 is a half pupil ray trace for the telescope of FIG. 5.

Figure 1:
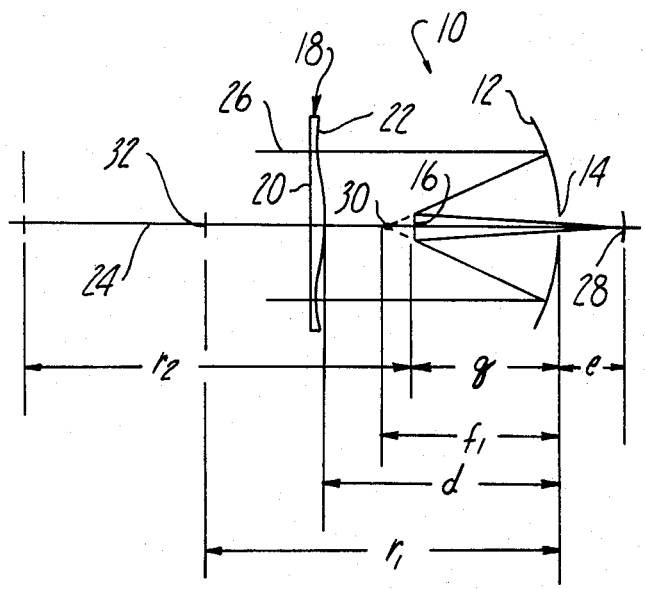
FIG. 1 is a semi-schematic view of a telescope objective embodying this invention.

Referring in more detail to the drawings, FIG. 1 is a semi-schematic showing of a Cassegrain telescope 10 embodying this invention. Telescope 10 has a spherical primary mirror 12 with a center hole 14 therethrough, a spherical secondary mirror 16, and a corrector plate 18 with a plano entrance surface 20 and an aspherical exit surface 22. The mirrors 12 and 16 and the corrector plate 18 are constructed and arranged on a common geometric axis 24 so that light rays 26 passing through corrector plate 18 are collected by the primary mirror 12 and reflected by secondary mirror 16 to pass through the hole 14 in the primary mirror and be focused to an image on an image surface 28 intersecting the geometric axis 24 beyond the vertex of the primary mirror 12.

In accordance with this invention the vertex of aspheric surface 22 of corrector plate 18 is located on the geometric axis 24 between and spaced from the focal point 30 of the primary mirror and the center 32 of the radius of curvature of the primary mirror. The vertex of the secondary mirror 16 is located on the geometric axis 24 between and spaced from the vertex of the primary mirror 12 and the focal point 30 of the primary mirror, and the vertex of the image surface 28 is located on the geometric axis 24 beyond the vertex of the primary mirror 12 and preferably beyond or behind the entire primary mirror.

The distance ($d$) along the geometric axis from the vertex of the primary mirror 12 to the vertex of aspheric surface 22 of corrector plate 18 is in the range of 1.2 to 1.9 of the focal length ($f_1$) of the primary mirror, is usually in the range of 1.3 to 1.7 of the focal length of the primary mirror and is preferably about 1.5 of the focal length of the primary mirror. The distance ($q$) along the geometric axis from the vertex of primary mirror 12 to the vertex of secondary mirror 16 is in the range of five-tenths to eight-tenths of the focal length ($f_1$) of the primary mirror, is usually in the range of 0.6 to 0.75 of the focal length of the primary mirror and is preferably about 0.65 of the focal length of the primary mirror. The distance ($e$) along the geometric axis from the vertex of primary mirror 12 to the vertex of image surface 28 is in the range of 0.1 to 0.6 of the focal length ($f_1$) of the primary mirror, is usually in the range of 0.3 to 0.5 of the focal length of the primary mirror, and is preferably about four-tenths of the focal length of the primary mirror.

The dimensions for the configuration and arrangement of the mirrors, corrector plate, and image surface of a telescope embodying this invention can be determined from the following equations 1 through 6:

$$Q = \frac{M - E}{M + 1} \tag{1}$$

-continued $$E = M - (M + 1)Q, \quad (2)$$

$$T = \frac{1 + E}{M + 1}, \quad (3)$$

$$S = \frac{M(1 - Q)}{1 - M}, \quad (4)$$

$$\Delta Z = \frac{[(h/r_0)^4 - 1.5(h/r_0)^2]r_0}{256(n - 1)P'^3} + k. \quad (5)$$

$$P' = P_1/G^{1/3} \quad (6)$$

where:
$f_0$ = effective focal length of the entire mirror system;
$f_1$ = focal length of the primary mirror;
$f_2$ = focal length of the secondary mirror;
$E = (e/f_1)$ = back vertex distance ratio, or the distance from the vertex of the primary mirror to the vertex of the image surface (e) divided by the focal length of the primary mirror ($f_1$);
$M = (f_0/f_1)$ = secondary magnification ratio;
$h$ = radial height on the aspheric surface of the corrector plate from the geometric axis;
$r_0$ = one-half of the maximum effective diameter of the corrector plate, i.e., the maximum effective diametrical radius;
$n$ = index of refraction of the corrector plate;
$k$ = thickness of the corrector plate at the center thereof, i.e., at the geometric axis;
$P'$ = focal ratio of a classic Schmidt camera telescope with a primary of focal length $f_1$;
$P_1$ = focal ratio of the telescope embodying this invention;
$G$ = ratio of the figuring depth on the corrector plate to the figuring depth required for a corrector plate of a classical Schmidt camera telescope with a primary of focal length $f_1$;
$\Delta Z$ = change in thickness ($t_0$) of the corrector plate as a function of the radial distance ($h$) from the geometric center line or axis of the aspheric surface of the corrector plate;
$Q = (q/f_1)$ = distance along the geometric axis from the vertex of the primary mirror to the vertex of the secondary mirror divided by the focal length of the primary mirror;
$S = (f_2/f_1)$ = focal length of the secondary mirror divided by focal length of the primary mirror; and
$T$ = ratio of the minimum, unbaffled diameter of the secondary mirror to the effective diameter of the primary mirror for axial images.

The third order monochromatic aberrations of telescopes embodying this invention can be determined from the following equations 7 to 10:

$$B = \frac{1}{8f_1^3}\left\{1 + b_1 - \left[b_2 + \left(\frac{M+1}{M-1}\right)^2\right]\frac{(M-1)^3(1-Q)}{M^3} - G\right\}, \quad (7)$$

$$F = \frac{1}{8f_1^2}\left\{\frac{2}{M^2} + \left[b^2 + \left(\frac{M+1}{M-1}\right)^2\right]\frac{(M-1)^3Q}{M^3} - GD\right\}, \quad (8)$$

$$C = \frac{1}{8f_1}\left\{\frac{4(M-Q)}{M^2(1-Q)} - \left[b_2 + \left(\frac{M+1}{M-1}\right)^2\right]\frac{(M-1)^3Q^2}{M^3(1-Q)} - GD^2\right\}, \quad (9)$$

$$J = 1 + \frac{1}{S}, \quad (10)$$

where:
$B$ = spherical aberration coefficient;
$F$ = coma coefficient;
$C$ = astigmatism coefficient;
$J$ = radius of the Petzval image surface divided by $f_1$;
$D = (d/f_1)$ = distance along the geometric axis from the vertex of the primary mirror to the vertex of the aspheric surface of the corrector plate divided by the focal length of the primary mirror;
$b_1$ = conic constant for the primary mirror which for a spherical mirror = 0; and
$b_2$ = conic constant for the secondary mirror which for a spherical mirror = 0.

Figure 2:
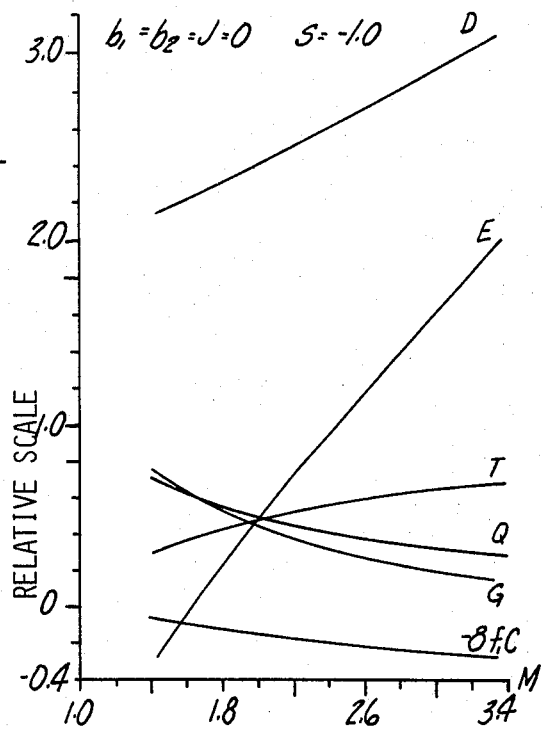
FIGS. 2 and 3 are graphs of selected data for prior art Cassegrain telescope objectives with corrector plates.
Figure 3:
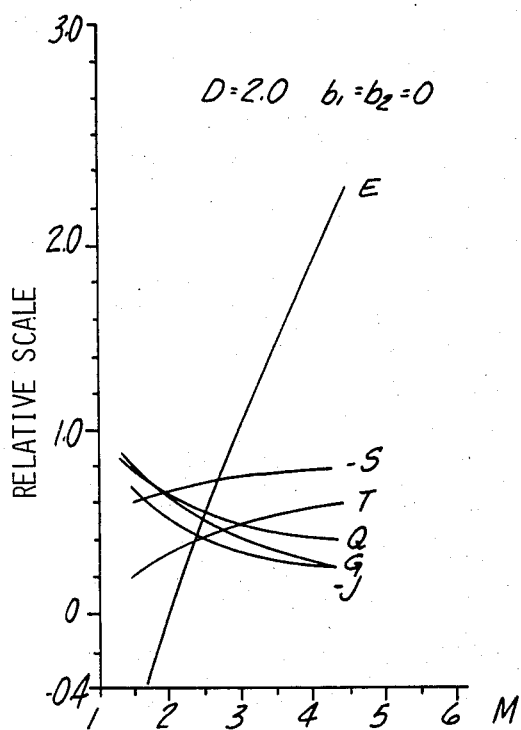
Figure 4:
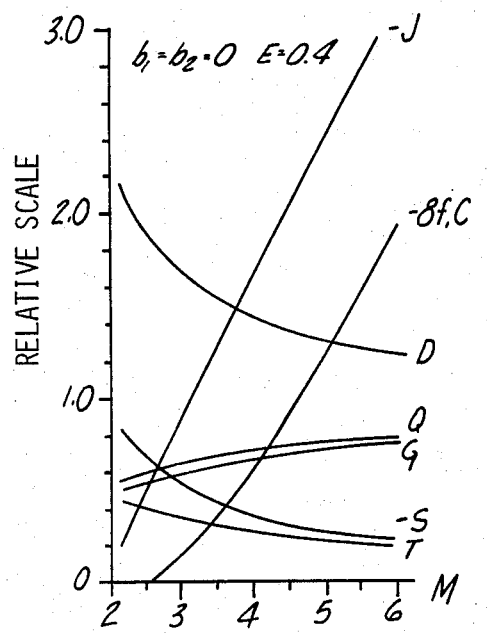
FIG. 4 is a graph of selected data for a telescope objective embodying this invention.

FIGS. 2 and 3 are graphs of selected data for prior art Cassegrain telescopes, and FIG. 4 is a graph of selected data for a telescope embodying this invention. The data of FIG. 2 is for a prior art Cassegrain telescope with a corrector plate and spherical primary and secondary mirrors having equal radii of curvature. The secondary mirror is located on the geometric axis between the vertex of the primary mirror and the focal point of the primary mirror and a corrector plate is located on the geometric axis more than two focal lengths in front of the vertex of the primary mirror. The data of FIG. 3 is for a prior art Cassegrain telescope with a corrector plate and spherical primary and secondary mirrors having unequal radii of curvature. Both mirrors are positioned on the geometric axis so that they have a common center for their radii of curvature, the corrector plate is located on the geometric axis at the common center of curvature, and the secondary mirror is located on the geometric axis between the vertex of the primary mirror and the focal point of the primary mirror. In both FIGS. 2 and 4 the trace of the function $8f_1C$ is a measure of the astigmatism of the telescopes. For good photographic and visual performance (i.e., near diffraction limited) over a field of view of 1° to 2°, $8f_1C$ should not be greater than about one. The telescope of FIG. 3 is anastigmatic (B, C and F are each equal to zero). The telescopes of FIGS. 2 and 4 are aplanats (B and F are each equal to zero) and can be designed as anastigmats.

Comparison of FIG. 4 with FIGS. 2 and 3 illustrates that the telescope of this invention has comparatively little astigmatism, is more compact in overall axial length, has a greater useful range and a larger maximum magnification of the image, a readily accessible image surface conveniently located behind or beyond the primary mirror, and less obstruction or blocking of light by the secondary mirror which obstruction decreases with increasing magnification of the image.

Figure 5:
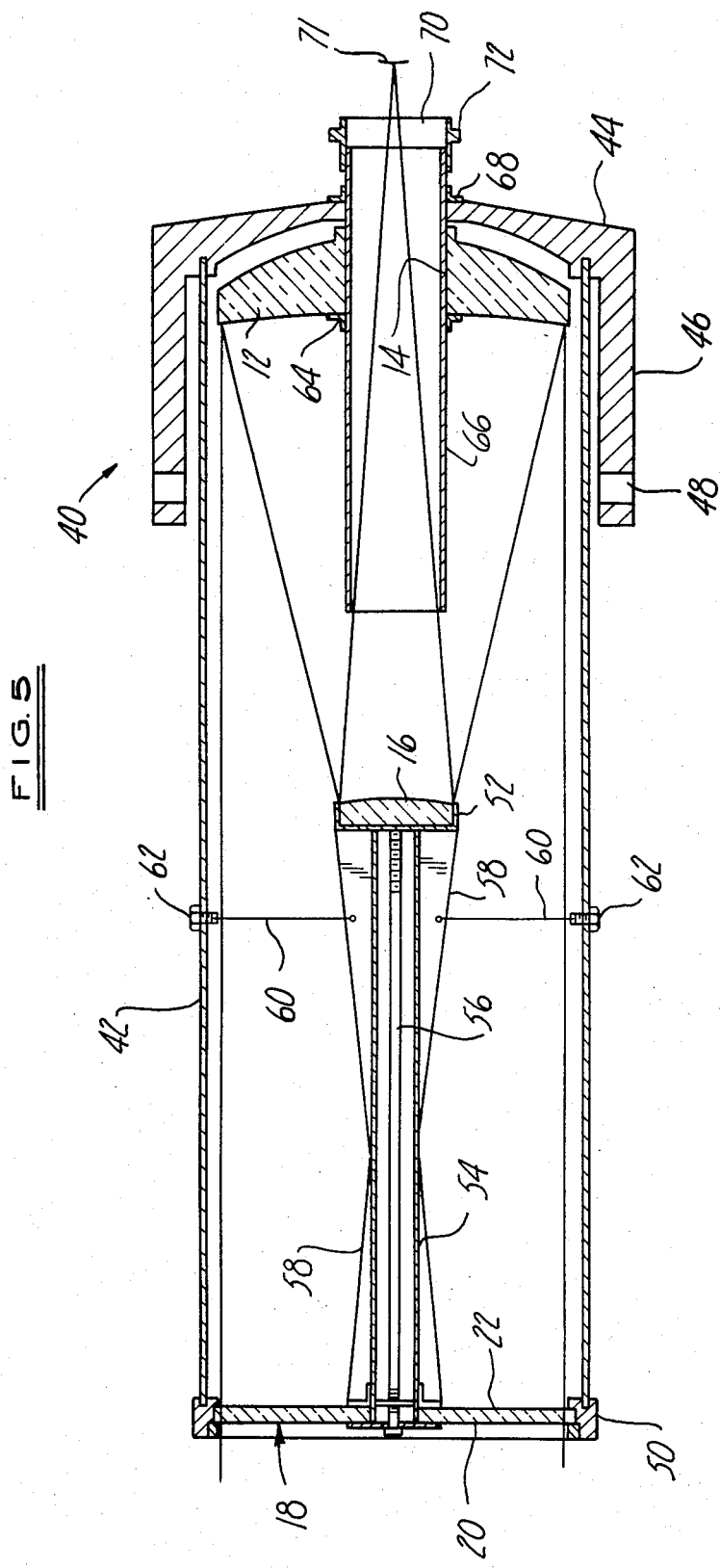
FIG. 5 is a sectional view of a telescope embodying this invention.

FIG. 5 illustrates a telescope 40 embodying this invention which has a main tube 42 received at one end in a mounting yoke 44 with a pair of arms 46 having holes 48 therein for pivotally mounting the telescope on its center of gravity so that the telescope requires little if any counterbalancing. A corrector plate 18 is carried by a mounting ring 50 fixed to the other end of tube 42. Secondary mirror 16 is received in a carrier 52 mounted on one end of a tubular support 54 the other end of which is fixed to the center portion of corrector plate 18.

Control of the angular position of secondary mirror 16 with respect to the geometric axis 24 of the telescope is provided by three long push-pull screws 56 (only one of which is shown) which extend through the interior of tubular support 54 and may be adjusted from the exterior of the telescope. Tube 54 is reinforced by four gussets 58 equally circumferentially spaced about and fixed to the exterior of the tube. The free end of tube 54 is centered and supported within tube 42 by four equally circumferentially spaced fine wires 60 each connected adjacent one end to a gusset 58 and adjacent the other end to a screw 62 received in tube 42. Screws 62 provide turn buckles to adjust the tension of the wires and thereby change the position within tubular housing 42 of the free end of tube 54 of secondary mirror 16. Supporting wires 60 can be fine music wire with a small diameter such as 0.005 of an inch and hence the image diffraction effects caused by their obstruction will be negligible. Since the entire structure for mounting secondary mirror 16 need not be any larger in diameter than the mirror itself, no additional obstruction or blocking of light from being collected by the primary mirror 12 is caused by the mounting structure.

Primary mirror 12 is retained by a ring 64 on an opaque mounting tube 66 extending through the central hole 14 in the mirror and secured by a collar 68 to yoke 44 of the telescope. Mounting tube 66 extends forwardly of primary mirror 12 to provide a shield preventing light which has not been reflected by secondary mirror 16 from passing through the hole 14 in mirror 12 and impinging on the image surface 28. An eye-piece 70 which refocuses the light at image plane 28 to a detector 71 such as the eye of an observer is mounted by a ring 72 on one end of tube 66 beyond the primary mirror 12. Ring 72 can be threaded or otherwise received on the end of tube 66 so that eye-piece 70 can be axially shifted with respect to mirrors 12 and 16 to focus the telescope.

If desired, tube 66 can be threaded or otherwise carried by collar 68 to shift the primary mirror 12 axially with respect to the secondary mirror 16 to focus the telescope. Likewise, retainer ring 64 can be threaded or otherwise mounted on tube 66 to permit primary mirror 12 to be axially shifted or adjusted with respect to secondary mirror 16 to focus the telescope.

An example of the dimensions and configuration of a telescope 40, which is given to illustrate the invention and not as a limitation thereof, is as follows:

| DESCRIPTION | DIMENSIONS |
|---|---|
| Diameter of corrector plate 18 | 12.0 inches |
| Plano surface 20 of corrector plate 18 | |
| Radius at vertex of aspheric surface 22 of corrector plate 18 | −3324.0 inches |
| Total sag (Z) of aspheric surface 22 of corrector plate 18 measured from the vertex of the surface 22 | $Z = -1.05 \times 10^{-4} h^2 + 0.2767 \times 10^{-5} h^4 + 0.9065 \times 10^{-9} h^6$ |
| Diameter of primary spherical mirror 12 | 12.5 inches |
| Radius of curvature of primary spherical mirror 12 | −48.0 inches |
| Diameter of secondary spherical mirror 16 | 3.9 inches |
| Radius of curvature of secondary spherical mirror 16 | −20.914 inches |
| Distance (d) along geometric axis from vertex of surface 22 of corrector plate 18 to vertex of primary spherical mirror 12 | 37.332 inches |
| Distance along geometric axis from vertex of secondary spherical mirror 16 to vertex of spherical primary mirror 12 | −16.533 inches |
| Distance along geometric axis from vertex of primary mirror 12 to vertex of image surface 28 | 8.660 inches |
| Back focal length (q + e) | 25.193 inches |
| Effective focal ratio | 6.8 |

As shown by the half pupil ray traces of FIG. 6, first order chromatic and third order monochromatic aberrations degrade the performance of the telescope of this example less than the diffraction effects of light over a one degree field of view and hence the performance of this telescope is diffraction limited throughout a one degree field of view.

Since both the mirrors 12 and 16 are spherical, they may be economically produced with a high degree of accuracy. The corrector plate 18 has a plane entrance surface 20 thus making the corrector plate insensitive to the thickness thereof and an aspheric exit surface 22 which to a first order approximation is a plano surface parallel to the plane entrance face 20 and thus the corrector plate is not very sensitive to tilt errors in mounting the corrector plate perpendicular to the axis 24 of the telescope.

The aspheric exit surface 22 of corrector plate 18 has a Kerber profile defined by equation 5 which minimizes chromatic and monochromatic aberrations. This Kerber profile can be readily and economically produced with a high degree of accuracy by known vacuum deforming techniques which utilize the generation of spherical surfaces in producing the aspheric surface 22 of the corrector plate. Such vacuum deforming techniques are described in articles by E. Everhart, Applied Optics 11, 1630 (1972). Thus, both the mirrors and the corrector plate of telescopes embodying this invention can be readily and ecnomically fabricated with a high degree of accuracy because they require only the generation of spherical surfaces.

Telescopes embodying this invention are highly suitable for visual observation of celestial bodies because they can be constructed with a large secondary magnification, no coma, no spherical aberration, little or no astigmatism, little distortion, little chromatic aberration, and modest field curvature.

I claim:

1. A telescopic objective comprising, in combination; a corrector plate, a first spherical mirror having a central hole therein, and a second spherical mirror all of which are constructed and arranged on a common geometric axis, the geometric centers of the radii of curvature of said first and second spherical mirrors are not coincident, the radius of curvature of said second spherical mirror is less than the radius of curvature of said first spherical mirror, the vertex of said corrector plate is positioned on the common geometric axis between and spaced from both the geometric center of the radius of curvature of said first spherical mirror and the focal point of said first spherical mirror, and the vertex of said second spherical mirror is positioned on the common geometric axis between and spaced from both the vertex of said first spherical mirror and the focal point of said first spherical mirror such that light passing through the corrector plate and collected by said first spherical mirror is reflected by said second spherical mirror to pass through said hole in said first spherical mirror and form an image on an image surface intersecting the geometric axis beyond the vertex of said first spherical mirror.

2. The telescopic objective of claim 1 wherein the diameter of said second spherical mirror is less than one-half of the effective diameter of said first spherical mirror.

3. The telescopic objective of claim 2 wherein the distance along the geometric axis from the vertex of said corrector plate to the vertex of said first spherical mirror is in the range of 1.3 to 1.7 of the focal length of said first spherical mirror.

4. The telescopic objective of claim 1 wherein the diameter of said second spherical mirror is in the range of two-tenths to four-tenths of the effective diameter of said first spherical mirror.

5. The telescopic objective of claim 4 wherein the distance along the geometric axis from the vertex of said corrector plate to the vertex of said first spherical mirror is in the range of 1.3 to 1.7 of the focal length of said first spherical mirror.

6. The telescopic objective of claim 5 wherein the distance along the geometric axis from the vertex of said first spherical mirror to the vertex of said second spherical mirror is in the range of 0.5 to 0.8 of the focal length of said first spherical mirror.

7. The telescopic objective of claim 6 wherein the distance along the geometric axis from the vertex of said first spherical mirror to the vertex of the image surface is in the range of 0.1 to 0.6 of the focal length of said first spherical mirror.

8. The telescopic objective of claim 1 wherein the distance along the geometric axis from the vertex of said corrector plate to the vertex of said first spherical mirror is in the range of 1.2 to 1.9 of the focal length of said first spherical mirror.

9. The telescopic objective of claim 1 wherein the distance along the geometric axis from the vertex of said corrector plate of the vertex of said first spherical mirror is in the range of 1.3 to 1.7 of the focal length of said first spherical mirror.

10. The telescopic objective of claim 9 wherein the distance along the geometric axis from the vertex of said first spherical mirror to the vertex of said second spherical mirror is in the range of 0.5 to 0.8 of the focal length of said first spherical mirror.

11. The telescopic objective of claim 10 wherein the distance along the geometric axis between the vertex of said first spherical mirror to the vertex of the image surface is in the range of 0.1 to 0.6 of the focal length of said first spherical mirror.

12. The telescopic objective of claim 9 wherein the distance along the geometric axis from the vertex of said first spherical mirror to the vertex of the image surface is in the range of 0.1 to 0.6 of the focal length of said first spherical mirror.

13. The telescopic objective of claim 1 wherein the distance along the geometric axis from the vertex of said first spherical mirror to the vertex of said second spherical mirror is in the range of 0.5 to 0.8 of the focal length of said first spherical mirror.

14. The telescopic objective of claim 13 wherein the distance along the geometric axis from the vertex of said first spherical mirror to the vertex of the image surface is in the range of 0.1 to 0.6 of the focal length of said first spherical mirror.

15. The telescopic objective of claim 1 wherein the distance along the geometric axis from the vertex of said first spherical mirror to the vertex of the image surface is in the range of 0.1 to 0.6 of the focal length of said first spherical mirror.

16. The telescopic objective of claim 1 wherein the first surface of said corrector plate through which light passes when entering the telescopic objective is a plane surface and the second surface of the corrector plate through which light passes to the primary mirror is an aspheric surface having a Kerber profile.

* * * * *